United States Patent
Kadota et al.

(10) Patent No.: US 12,546,377 B2
(45) Date of Patent: Feb. 10, 2026

(54) SHOCK ABSORBER

(71) Applicants: Hitachi Astemo, Ltd., Hitachinaka (JP); HONDA MOTOR CO., LTD., Tokyo (JP)

(72) Inventors: Nao Kadota, Hitachinaka (JP); Yuka Kubotera, Hitachinaka (JP); Takashi Nakagawa, Hitachinaka (JP); Dustin M. Schroeder, Raymond, OH (US); Masayuki Tsutsui, Raymond, OH (US)

(73) Assignees: HITACHI ASTEMO, LTD., Hitachinaka (JP); HONDA MOTOR CO., LTD., Tokyo (JP)

( * ) Notice: Subject to any disclaimer, the term of this patent is extended or adjusted under 35 U.S.C. 154(b) by 382 days.

(21) Appl. No.: 18/299,817

(22) Filed: Apr. 13, 2023

(65) Prior Publication Data

US 2024/0344587 A1 Oct. 17, 2024

(51) Int. Cl.
*F16F 13/00* (2006.01)
*B60G 15/06* (2006.01)

(52) U.S. Cl.
CPC .......... *F16F 13/007* (2013.01); *B60G 15/065* (2013.01); *B60G 2202/312* (2013.01); *F16F 2224/0216* (2013.01); *F16F 2230/0023* (2013.01); *F16F 2230/007* (2013.01); *F16F 2230/30* (2013.01)

(58) Field of Classification Search
CPC .................. F16F 2224/0216; F16F 2230/0023
See application file for complete search history.

(56) References Cited

U.S. PATENT DOCUMENTS

| | | | | | |
|---|---|---|---|---|---|
| 2,902,274 | A | * | 9/1959 | McIntyre | B60G 15/063 267/221 |
| 2003/0213322 | A1 | * | 11/2003 | Yabe | F16H 25/2219 74/424.82 |
| 2021/0300139 | A1 | | 9/2021 | D'Orazio et al. | |

FOREIGN PATENT DOCUMENTS

| | | | | |
|---|---|---|---|---|
| CN | 204921817 U | * | 12/2015 | |
| EP | 3885605 A1 | * | 9/2021 | ............ F16F 13/007 |

* cited by examiner

*Primary Examiner* — Devon C Kramer
(74) *Attorney, Agent, or Firm* — Rankin, Hill & Clark LLP (57) ABSTRACT

A shock absorber includes a cylinder, a sleeve provided so as to surround the outer circumferential surface of the cylinder, the cylinder formed of a different material from a material for the cylinder, first and second springs provided along the outer circumferential surface of the sleeve, and a slider provided between the first spring and the second spring, and capable of being displaced in an axal direction. The materials for the cylinder and the sleeve are a combination of materials that causes corrosion due to a contact of either one of those with the other one of those. A corrosion inhibitor is provided which suppresses an occurrence of corrosion on the cylinder or on the sleeve. In one embodiment, the materials are metals.

11 Claims, 7 Drawing Sheets

SHOCK ABSORBER

FIELD OF THE INVENTION

The present disclosure relates to a shock absorber.

BACKGROUND OF THE INVENTION

For example, in order to damp vibrations, etc., that are applied to a wheel from a ground surface, a vehicle has a shock absorber suspended between the wheel and a vehicle body. US 2021/0300139A discloses a conventional technology relating to such a shock absorber.

FIG. 3 of US 2021/0300139A discloses a shock absorber that includes an aluminum-made shock body formed in a cylindrical shape, an iron-made sleeve provided so as to surround the outer circumferential surface of the shock body, a primary spring and a tender spring both provided along the outer circumferential surface of the sleeve, and a spring coupler which is provided between the primary spring and the tender spring, receives pushing forces from both the primary spring and the tender spring, and can be displaced along the outer circumferential surface of the sleeve.

By employing a structure in which the shock body cylinder is surrounded by the sleeve, and the spring coupler slides over the outer circumferential surface thereof, in comparison with a case in which the spring coupler is directly provided on the outer circumferential surface of the shock body cylinder, the cylinder can be protected.

In such a shock absorber, when water enters between the shock body and the sleeve due to long-term use, the shock body may corrode. This is not preferable from the standpoint of the life-of the shock absorber. For the shock absorber disclosed in US '139, the relevant materials for the shock absorber are metals (aluminum and iron) and the type of corrosion is a bimetallic corrosion. However, this potential corrosion concern is not limited to combinations of metals that are subject to bimetallic corrosion, and could also include other combinations of materials subject to different types of corrosion other than bimetallic corrosion.

SUMMARY OF THE INVENTION

An objective of the present disclosure is to provide a shock absorber that can extend the life-thereof.

Upon keen research and development efforts, the inventors of the present disclosure achieved a technical knowledge such that corrosion which may occur on a shock body cylinder or on a sleeve can be suppressed by causing a shock absorber to have a corrosion inhibitor for suppressing an occurrence of corrosion on the cylinder or on the sleeve. The present disclosure is accomplished based on such a technical knowledge.

The present disclosure will be described below.

According to the present disclosure, a shock absorber is provided which includes:
  a cylinder which is formed in a substantially cylindrical shape;
  a sleeve which is formed in a substantially cylindrical shape, provided so as to surround an outer circumferential surface of the cylinder, and is formed of a material that differs from a material of the cylinder;
  first spring and second spring that are two springs provided along an outer circumferential surface of the sleeve; and
  a slider which is provided between the first spring and the second spring, receives pushing forces from both the first spring and the second spring, and is capable of being displaced along the outer circumferential surface of the sleeve.

According to one embodiment, the material applied for the cylinder and the material applied for the sleeve are a combination of metals that causes bimetallic corrosion due to a contact of either one of the cylinder or the sleeve with the other one of the sleeve or the cylinder. However, the invention is not limited to the use of metals subject to bimetallic corrosion and could be used for other combinations of materials subject to different forms of corrosion other than bimetallic corrosion.

A corrosion inhibitor is provided which suppresses an occurrence of the corrosion on the cylinder or on the sleeve.

According to the present disclosure, extension of the life of a shock absorber can be accomplished.

DETAILED DESCRIPTION OF THE PREFERRED EMBODIMENTS

Embodiments of the present disclosure will be described below with reference to the accompanying figures. Note that the embodiments illustrated in the accompanying figures are merely examples of the present disclosure, and the present disclosure is not limited to such embodiments.

First Embodiment

Figure 1:
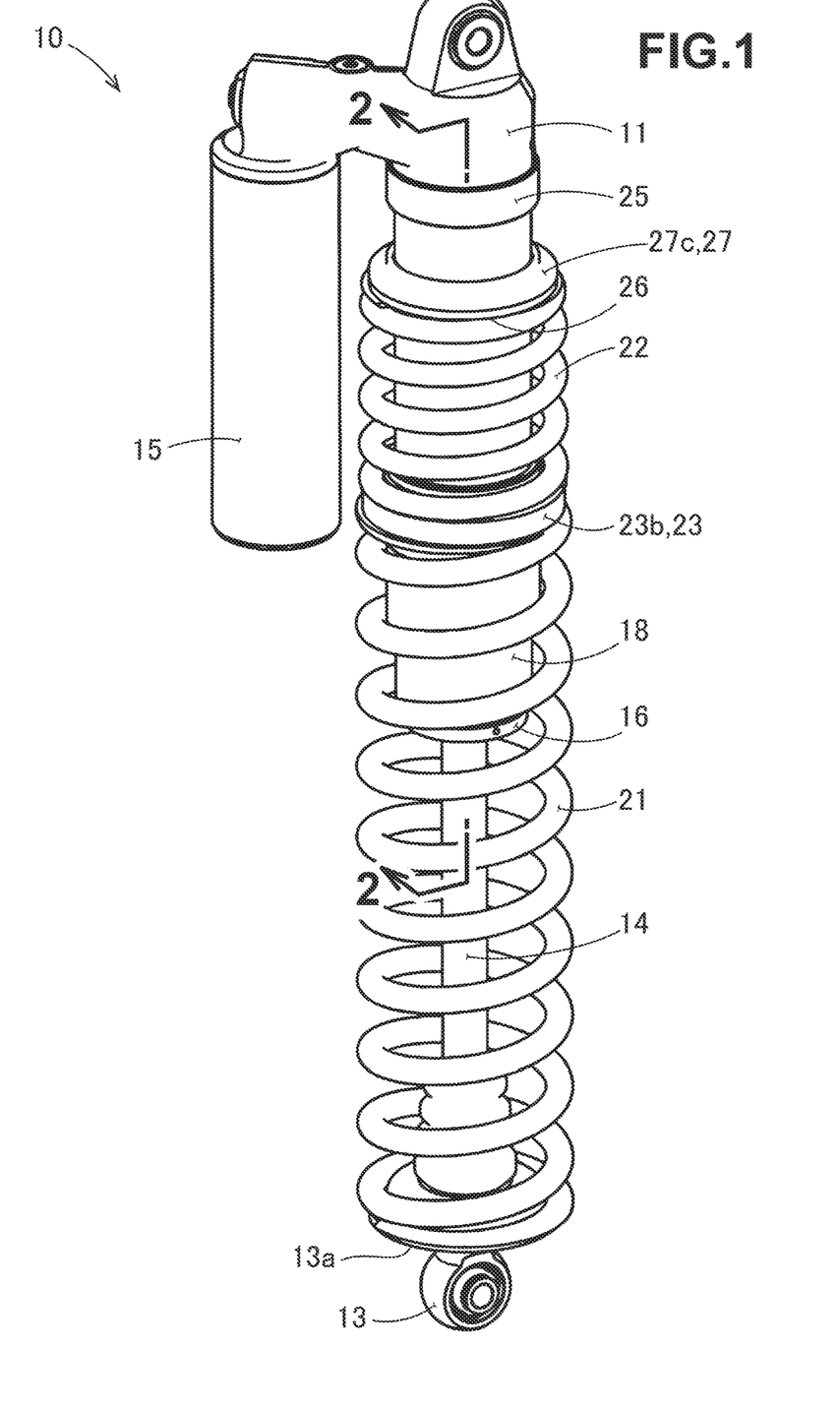
FIG. 1 is a perspective view of a shock absorber according to a first embodiment.

With reference to FIG. 1, a shock absorber 10 is, for example, loaded on a side-by-side vehicle.

The shock absorber 10 is, for example, a hydraulic shock absorber which has an upper end fastened to a vehicle body, has a lower end fastened to another vehicle component such as a suspension arm, and produces damping force by an oil filled in such an absorber. The details will be described below.

Figure 2:
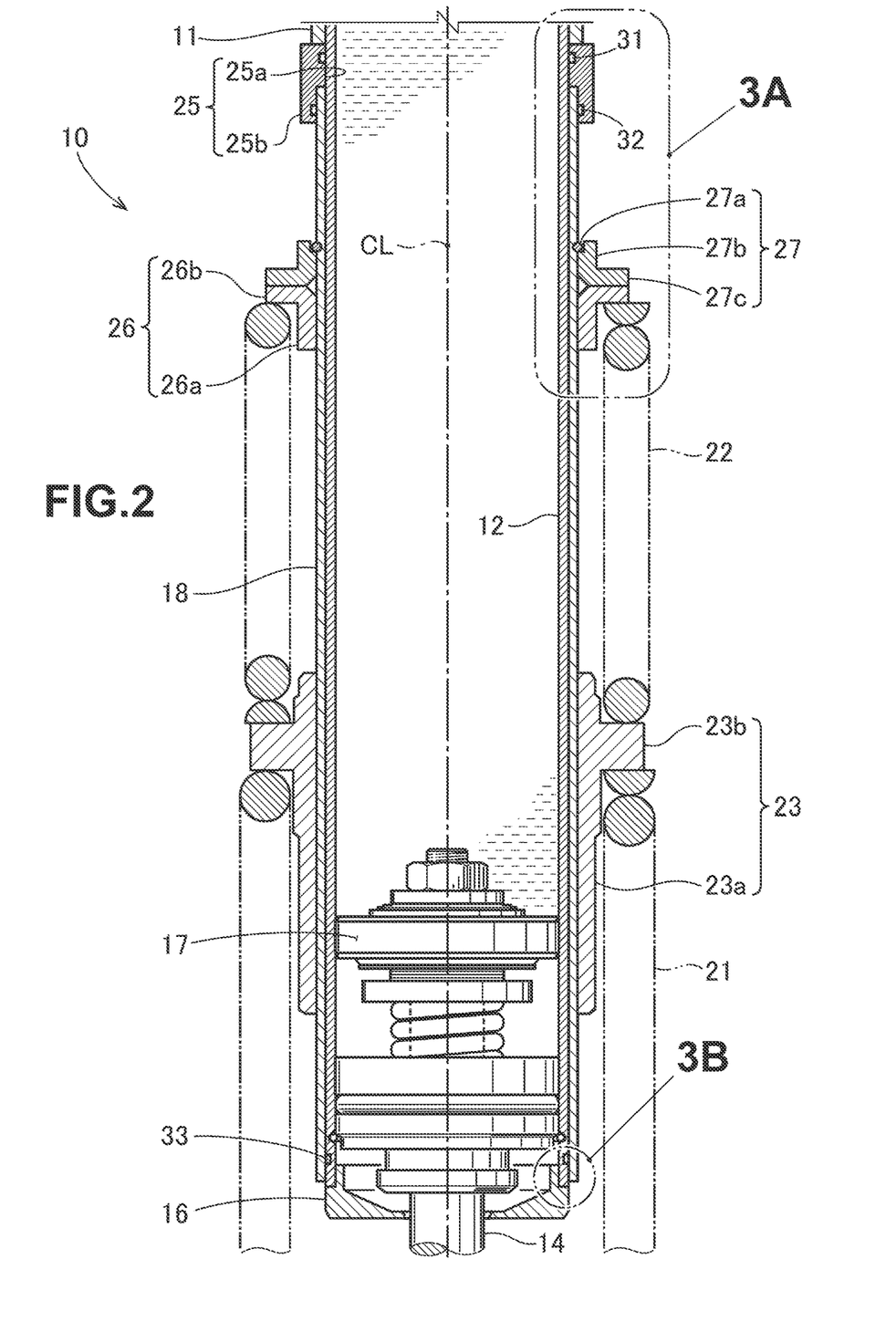
FIG. 2 is a cross-sectional view taken along a line 2-2 in FIG. 1.

With reference to also FIG. 2, the shock absorber 10 includes an upper lid component 11 which is located at an upper end and which is fastened to the rear section of a vehicle body, a cylinder 12 which has an upper end fastened to the upper lid component 11, and which is formed in a substantially cylindrical shape, a fastened-to-wheel component 13 which is located at a lower end, and which is fastened to a side part of a wheel, a rod 14 in a bar shape which extends from the fastened-to-wheel component 13 to the interior of the cylinder 12, and a sub tank 15 which is connected to the upper lid component 11, and into which an oil flows when force in a compression direction is applied inside the cylinder 12.

Moreover, the shock absorber 10 includes a lower lid component 16 that closes the lower end of the cylinder 12, a piston 17 which is supported by the tip of the rod 14, and which can move forward and backward in the cylinder 12 along an axial line CL of the cylinder 12, a sleeve 18 in a cylindrical shape which is provided along the outer circumferential surface of the cylinder 12, a first spring 21 and a second spring 22 which are springs provided so as to surround the circumference of the sleeve 18, and a slider 23 which is provided between the first spring 21 and the second spring 22, and which can be displaced along the outer circumferential surface of the sleeve 18.

Figure 3A:
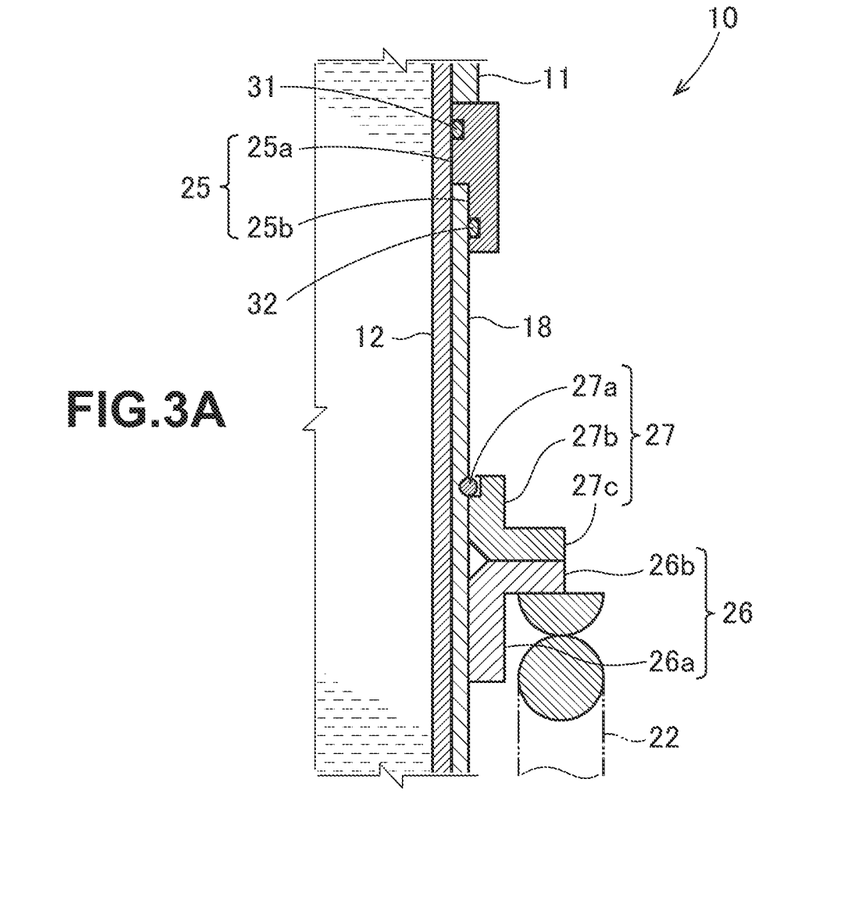
FIG. 3A is an enlarged diagram of a part 3A in FIG. 2.

With reference to FIG. 3A, the shock absorber 10 includes an abutting member 25 which is provided on the outer circumference of the cylinder 12, and which abuts the upper end (a first end) of the sleeve 18, a spring catch member 26 which is provided on the outer circumference of the sleeve 18 so as to be slidable, and which catches the upper end of the second spring 22, and a fastened member 27 which abuts the spring catch member 26, and which is fastened to the outer circumferential surface of the sleeve 18.

The abutting member 25 is provided with an upper-end-part sealing member 31 that seals a space between the first end of the sleeve 18 and the cylinder 12, and an abutting-member sealing member 32 that seals a space between the sleeve 18 and the abutting member 25.

Figure 3B:
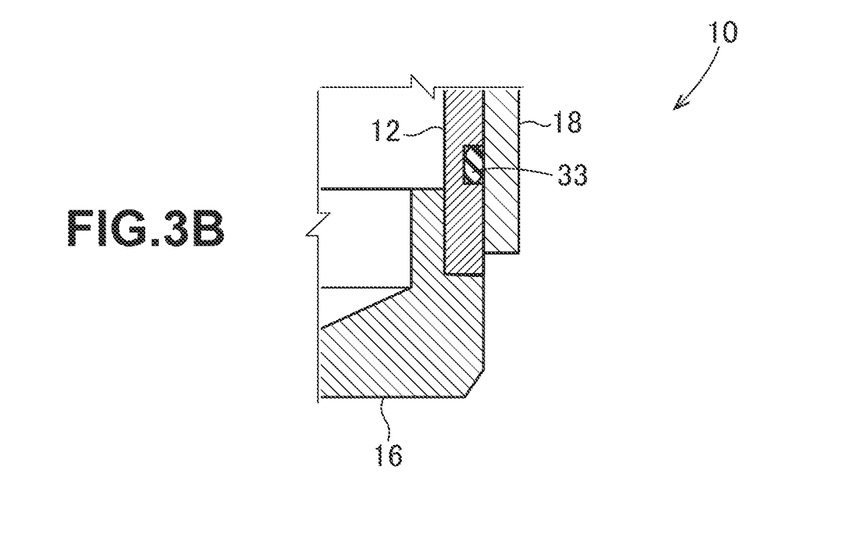
FIG. 3B is an enlarged diagram of a part 3B in FIG. 2.

With reference to FIG. 3B, the cylinder 12 and the lower end (a second end) of the sleeve 18 are provided with a lower-end-part sealing member 33 which seals a space between the cylinder 12 and the sleeve 18.

With reference to also FIG. 3A, in the following description, the upper-end-part sealing member 31 and the lower-end-part sealing member 33 will be also referred to as respective-end-part sealing members 31 and 33 as appropriate. The respective-end-part sealing members 31 and 33 are provided at respective ends of a section where the cylinder 12 and the sleeve 18 overlap with each other, and seal a region between the cylinder 12 and the sleeve 18. This suppresses entrance of water droplets, etc., between the cylinder 12 and the sleeve 18, and suppresses corrosion of the sleeve 18. The respective-end-part sealing members 31 and 33 can be also defined as corrosion inhibitors to suppress the occurrence of corrosion on the cylinder 12 or on the sleeve 18. In the following description, the respective-end-part sealing members 31 and 33 will be also referred to as corrosion inhibitors 31 and 33. Alternatively, the combination of the respective-end-part sealing members 31 and 33 and the abutting-member sealing member 32 will be also referred to as corrosion inhibitors 31 to 33.

Note that the upper-end-part sealing member 31 may be provided between the cylinder 12 and the sleeve 18 like the lower-end-part sealing member 33.

With reference to FIGS. 1 and 2, the upper lid component 11 closes the upper end (the first end) of the cylinder 12, and has a fluid passage that guides the oil pushed out from the cylinder 12 into the sub tank 15. Moreover, the lower end of the upper lid component 11 restricts the displacement of the sleeve 18 in the upper direction (a one direction). With respect to the restriction of the displacement of the sleeve 18 in the one direction (the upper direction), the upper lid component 11 can be also referred to as a displacement restricting component. In the following description, the upper lid component 11 may be referred to as the displacement restricting component 11.

Note that the displacement of the sleeve 18 in the one direction may be also restricted by, for example, fastening a C-ring to the outer circumferential surface of the cylinder 12. That is, it is adequate as far as the displacement of the sleeve 18 in the one direction is restricted, and the structure of the displacement restricting component 11 is not limited to the upper lid component 11 or the C-ring.

The cylinder 12 has substantially uniform inner diameter and outer diameter across the entire length. An axial line CL of the cylinder 12 is consistent with an axial line CL of the rod 14.

A spring catch portion 13a that catches the lower end (the second end) of the first spring 21 is formed at the upper end of the fastened-to-wheel component 13.

With reference to FIG. 2 only, the lower lid component 16 closes the second end of the cylinder 12, and has a hole through which the rod 14 passes completely and which is formed at the center.

The piston 17 can move up and down inside the cylinder 12. When the piston 17 moves up and down inside the cylinder 12, the oil passes the interior of the piston 17, and thus damping force is produced. The sleeve 18 has substantially uniform inner diameter and
outer diameter across the entire length. An axial line CL of the sleeve 18 is consistent with the axial line CL of the cylinder 12.

According to one embodiment, the shock body cylinder 12 could be made from a metal material such as an aluminum alloy and the sleeve 18 could be made from a metal material such as stainless steel. In such a case the type of corrosion would be a bimetallic form of corrosion. However, the invention is not so limited. The present invention could alternatively be used with other combinations of materials subject to differing forms of corrosion other than bimetallic corrosion. Such other material combinations could include non-metals, such as plastics, resins or carbon fiber for example, or possibly a combination of a metal and a non-metal.

According to one embodiment, the material for the cylinder 12 could be an aluminum alloy having a hardness HV between 45 to 100 and the material for the sleeve could be a stainless steel having a hardness HIV between 180 to 650. Forming the sleeve 18 from a harder material than the cylinder 12 could enhance a protective capability for the cylinder 12. However, the invention is not so limited and could alternatively be used with a combination of materials in which the sleeve 18 is softer than the cylinder 12 (for example, a sleeve made from a softer plastic material and intended to be sacrificial or replaceable).

The first spring 21 is a compression spring which pushes the spring catch portion 13a (see FIG. 1) downwardly, and which pushes the slider 23 upwardly. The spring rate of the first spring 21 is greater than the spring rate of the second spring 22, and the first spring 21 accomplishes the primary role of a spring.

The second spring 22 is a compression spring which pushes the slider 23 downwardly and which pushes the spring catch member 26 upwardly. Moreover, the upward pushing force of the second spring 22 is transmitted to the fastened member 27, the sleeve 18, and the abutting member 25 through the spring catch member 26. The displacement of the abutting member 25 in the upper direction is restricted by the displacement restricting component 11. The spring rate of the second spring 22 is smaller than the spring rate of the first spring 21.

The slider 23 includes a cylindrical slider main body 23a provided along the outer circumferential surface of the sleeve 18, and a slider protrusion 23b protruding outwardly in the radial direction from the slider main body 23a. The slider protrusion 23b is formed across the entire circumference of the outer circumferential surface of the slider body 23a, and catches the first spring 21 and the second spring 22 by the lower surface and the upper surface, respectively.

With reference to FIG. 3A, the abutting member 25 includes an abutting-member main body 25a which is provided along the outer circumferential surface of the cylinder 12 and which abuts the upper end of the sleeve 18, and an abutting-member extended portion 25b extended along the outer circumferential surface of the sleeve 18 from the abutting-member main body 25a. The abutting member 25 is provided so as to be slidable along the outer circumferential surface of the cylinder 12.

The spring catch member 26 includes a substantially cylindrical spring catch cylinder 26a that is provided along the outer circumferential surface of the sleeve 18, and a spring catch main body 26b which protrudes outwardly in the radial direction from the upper end of the spring catch cylinder 26a and which catches the upper end of the second spring 22. The spring catch main body 26b is formed across the entire circumference of the spring catch cylinder 26a. The spring catch member 26 is provided so as to be slidable along the outer circumferential surface of the sleeve 18.

The fastened member 27 includes a ring member 27a in a substantially ring shape fitted to the outer circumferential surface of the sleeve 18, a cylindrical fastened-member cylinder 27b that is provided along the outer circumferential surface of the sleeve 18, and a fastened-member protrusion 27c which protrudes outwardly in the radial direction from the lower end of the fastened-member cylinder 27b, and which abuts the spring catch main body 26b. The fastened-member cylinder 27b and the fastened-member protrusion 27c are formed integrally with each other.

An example ring member 27a is a C-ring formed in a substantially C-shape. A part of the ring member 27a protrudes outwardly in the radial direction relative to the outer circumferential surface of the sleeve 18. This restricts the upward displacements of the fastened-member cylinder 27b and of the fastened-member protrusion 27c, and also the upward displacements of the spring catch member 26 and of the second spring 22.

Conversely, the pushing force of the second spring 22 is transmitted to the sleeve 18 through the fastened-member protrusion 27c, the fastened-member cylinder 27b, and the ring member 27a from the spring catch main body 26b. The pushing force transmitted to the sleeve 18 is further transmitted to the upper lid component 11 through the abutting member 25. That is, the pushing force of the second spring 22 pushes the sleeve 18 toward the upper lid component 11.

The upper-end-part sealing member 31 is provided at the abutting-member main body 25a, and is, for example, an O-ring. The upper-end-part sealing member 31 is intimately in contact with the outer circumferential surface of the cylinder 12. The upper-end-part sealing member 31 may be provided at the outer circumferential surface of the cylinder 12.

The abutting-member sealing member 32 is provided at the abutting-member extended portion 25b, and is, for example, an O-ring. The abutting-member sealing member 32 is intimately in contact with the outer circumferential surface of the sleeve 18. The abutting-member sealing member 32 may be provided at the outer circumferential surface of the sleeve 18.

With reference to FIG. 3B, the lower-end-part sealing member 33 is provided at the cylinder 12, and is, for example, an O-ring. Such a member may be provided at the inner circumference of the sleeve 18.

Second Embodiment

Next, a second embodiment will be described with reference to the figures.

Figure 4:
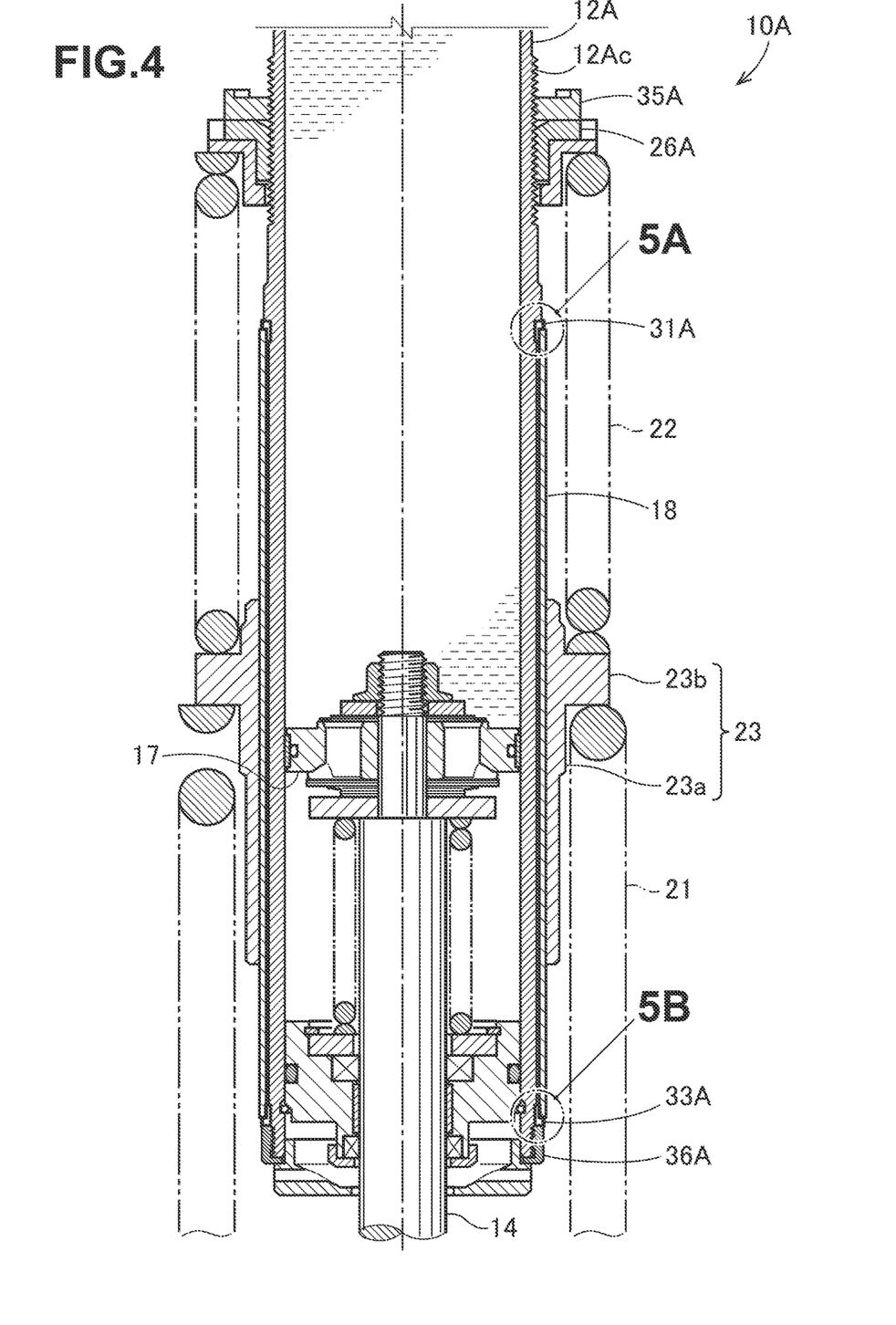
FIG. 4 is a cross-sectional view of a major section of a shock absorber according to a second embodiment.
Figure 5A:
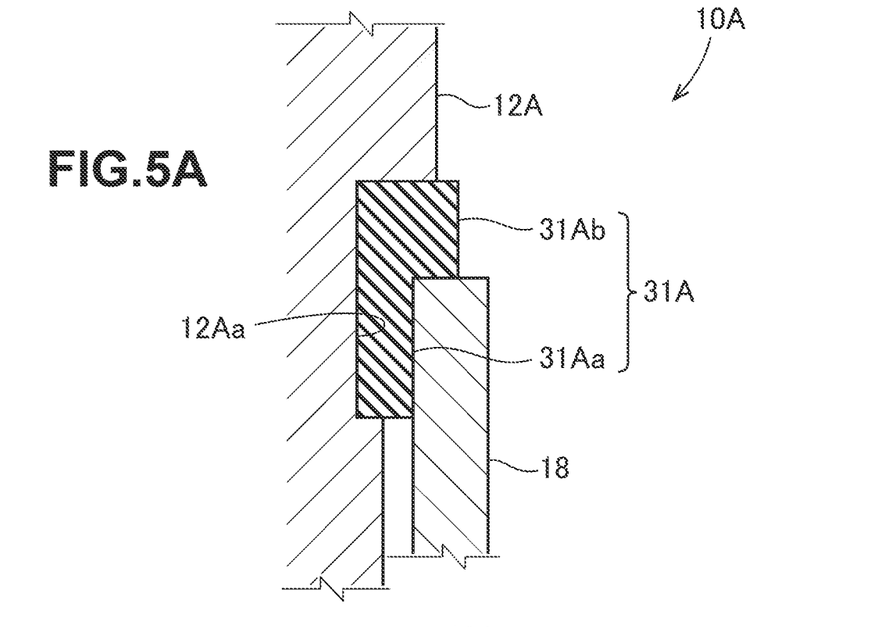
FIG. 5A is an enlarged view of a part 5A in FIG. 4.
Figure 5B:
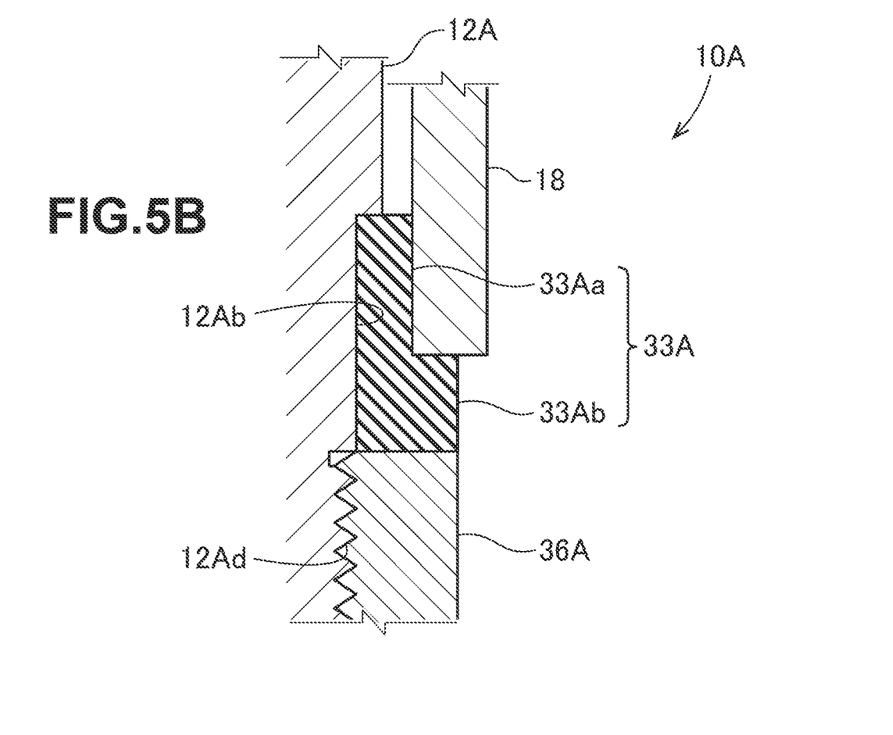
FIG. 5B is an enlarged view of a part 5B in FIG. 4.

With reference to FIG. 4, FIG. 5A, and FIG. 5B, a shock absorber 10A according to the second embodiment has a difference in structures of corrosion inhibitors 31 and 33 from those of the corrosion inhibitors 31A and 33A of the first embodiment. The same structural component as that of the shock absorber 10 according to the first embodiment will be denoted by the same reference numeral, and the detailed description thereof will be omitted.

With reference to FIGS. 5A and 5B, a cylinder 12A is provided with small-diameter portions 12Aa and 12Ab which have a smaller diameter than that of the adjacent portion. An upper-end-part sealing member 31A is fitted in the small-diameter portion 12Aa formed at the upper side, and a lower-end-part sealing member 33A is fitted in the small-diameter portion 12Ab formed at the lower side.

In the following description, the upper-end-part sealing member 31A and the lower-end-part sealing member 33A will be also referred to as respective-end-part sealing members 31A and 33A as appropriate. The respective-end-part sealing members 31A and 33A are provided at the respective ends of a section where the cylinder 12A and the sleeve 18 overlap with each other, and seals a region between the cylinder 12A and the sleeve 18. The respective-end-part sealing members 31A and 33A can be also defined as corrosion inhibitors 31A and 33A that suppress the occurrence of corrosion on the cylinder 12A or on the sleeve 18.

The upper-end-part sealing member 31A includes a first side portion 31Aa that extends along the outer circumferential surface of the cylinder 12A, and a second side portion 31Ab which is elongated outwardly in the radial direction from the first side portion 31Aa and which abuts the first end of the sleeve 18. The first side portion 31Aa is fitted in the small-diameter portion 12Aa.

The lower-end-part sealing member 33A includes a first side portion 33Aa that extends along the outer circumferential surface of the cylinder 12A, and a second side portion 33Ab which elongated outwardly in the radial direction from the first side portion 33Aa and which abuts the second end of the sleeve 18. The first side portion 33Aa is fitted in the small-diameter portion 12Ab.

With reference to FIG. 4, a male-screw part 12Ac in a male-screw shape is formed in the outer circumferential surface of the upper portion of the cylinder 12A. A spring catch member 26A that catches the upper end of the second spring 22 is provided at the outer circumference of the upper portion of the cylinder 12A so as to be movable in the direction along the axial line CL. An upper stopper 35A which has an inner circumference formed in a female-screw shape and which restricts the upward movement of the spring catch member 26A is coupled to the outer circumference of the male-screw part 12Ac.

With reference to FIG. 5B, the outer circumferential surface of the lower end (the second end) of the cylinder 12A is designed as a male-screw part 12Ad formed in a male-screw shape. A lower stopper 36A which has an inner circumference formed in a female-screw shape and which has a tip abutting the lower-end-part sealing member 33A is coupled to the male-screw part 12Ad. The lower stopper 36A suppresses, through the lower-end-part sealing member 33A, a fall-out of the sleeve 18 downwardly.

With reference to also FIG. 5A, regarding the sleeve 18, the upward movement is restricted by the cylinder 12A through the upper-end-part sealing member 31A, and the downward movement is restricted by the lower stopper 36A through the lower-end-part sealing member 33A.

Third Embodiment

Next, a third embodiment will be described with reference to the figures.

Figure 6:
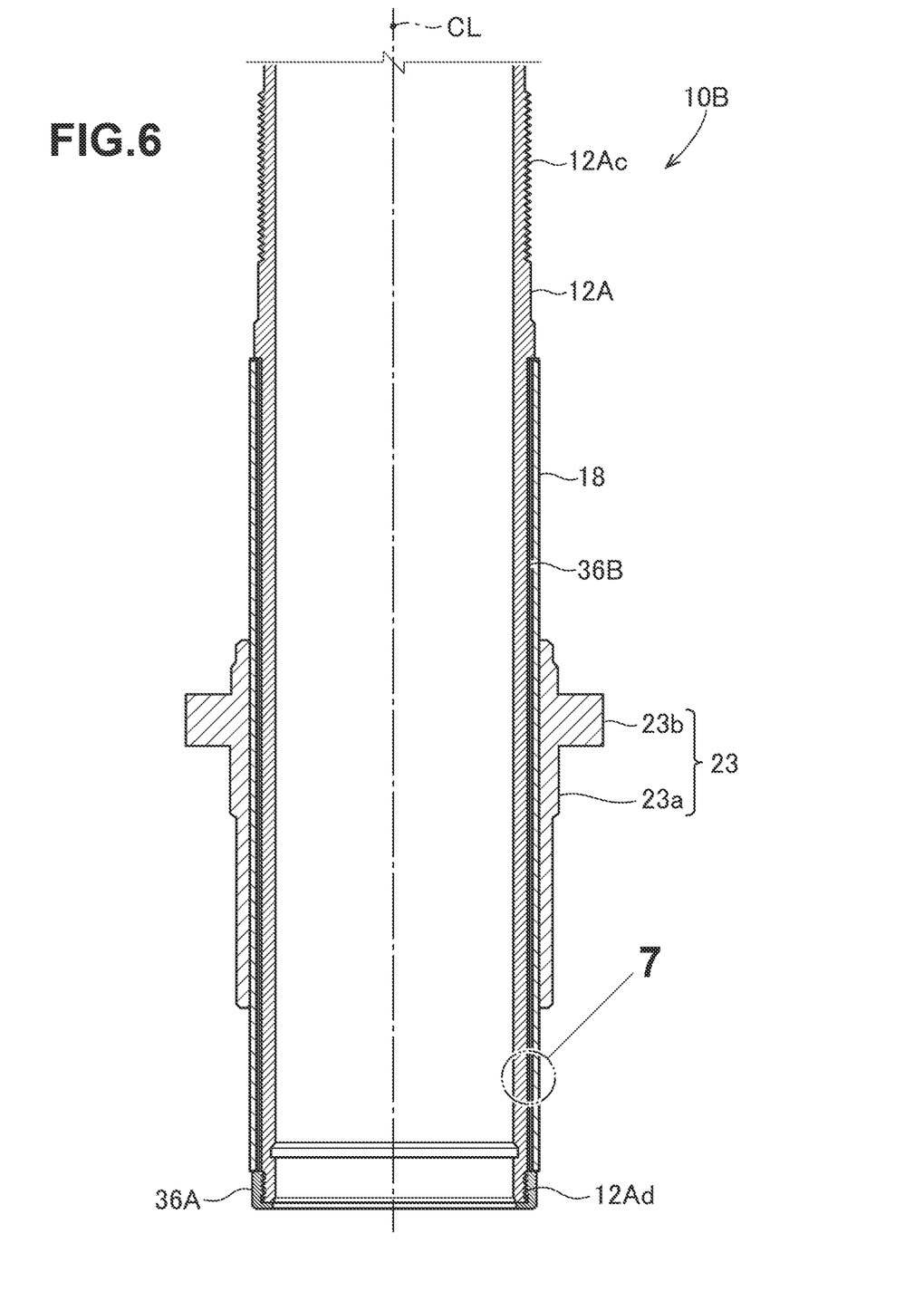
FIG. 6 is a cross-sectional view of a major section including a cylinder, a sleeve, and a slider which are utilized in a shock absorber according to a third embodiment.
Figure 7:
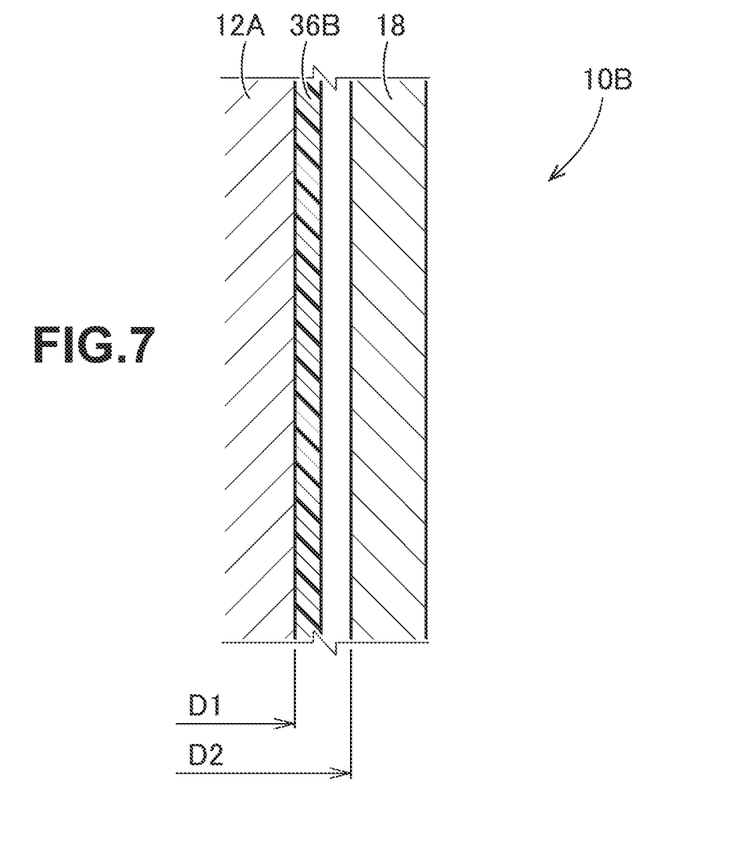
FIG. 7 is an enlarged view of a part 7 in FIG. 6.

With reference to FIGS. 6 and 7, a shock absorber 10B according to the third embodiment has a difference in the structure of a corrosion inhibitor 36B from those of the corrosion inhibitors 31 and 33 (see FIG. 2) according to the first embodiment and from those of the corrosion inhibitors 31A and 33A (see FIG. 4) according to the second embodiment. The same structural component as that of the shock absorber 10 according to the first embodiment, and/or the shock absorber 10A according to the second embodiment will be denoted by the same reference numeral, and the detailed description thereof will be omitted.

With reference to FIG. 7, in the shock absorber 10B, a corrosion inhibiting resin component 36B which is formed of resin and which is formed in a cylindrical shape is provided in a region between the cylinder 12A and the sleeve 18. Example corrosion inhibiting resin component 36B applicable are a pipe or a piece of sheet formed of resin, and a sticker formed of resin.

When a resin-made sheet is applied, it is rounded in a cylindrical shape so as to have a larger diameter than an outer diameter D1 of the cylinder 12A but smaller than an internal diameter D2 of the sleeve 18 and to have respective ends overlapped with other, and is inserted in a region between the cylinder 12A and the sleeve 18. Moreover, when a sticker is applied, the sticker is pasted on the outer circumferential surface of the cylinder 12A in advance across the whole circumference. By pasting along the outer circumferential surface of the cylinder 12A, the sticker is to be formed in a cylindrical shape.

The corrosion inhibiting resin component 36B can be also referred to as the corrosion inhibitor 36B that suppresses an occasion of corrosion on the cylinder 12A or on the sleeve 18.

The above-described shock absorbers 10, 10A, and 10B will be summarized as follows.

With reference to FIG. 2, according to a first example embodiment, the shock absorber 10 includes a cylinder 12 which is formed in a substantially cylindrical shape, and which is formed of a metal, the sleeve 18 which is formed in a substantially cylindrical shape, provided so as to surround the outer circumferential surface of the cylinder 12, and is formed of a different metal from the metal of the cylinder 12, the first spring 21 and second spring 22 that are two springs provided along the outer circumferential surface of the sleeve 18, and the slider 23 which is provided between the first spring 21 and the second spring 22, receives pushing forces from both the first spring 21 and the second spring 22, and is capable of being displaced along the outer circumferential surface of the sleeve 18. The material applied for the cylinder 12 and the material applied for the sleeve 18 are a combination of materials that causes corrosion due to a contact of either one of the cylinder 12 or the sleeve 18 with the other one of the sleeve 18 or the cylinder 12, and corrosion inhibitors 31 and 33 are provided which suppress an occurrence of the corrosion on the cylinder 12 or on the sleeve 18.

Providing the corrosion inhibitors 31 and 33 suppresses an occurrence of corrosion on the cylinder 12 or on the sleeve 18. This extends the life-of the shock absorber 10. The same is true of the shock absorber 10A illustrated in FIG. 3, and the shock absorber 10B illustrated in FIG. 6.

Second, according to the shock absorber of the first example embodiment, the respective-end-part sealing members 31 and 33 which seal the region between the cylinder 12 and the sleeve 18 are provided at respective ends of a section where the cylinder 12 and the sleeve 18 overlap with each other, and the corrosion inhibitors 31 and 33 are formed by the respective-end-part sealing members 31 and 33, respectively.

By sealing the region between the cylinder 12 and the sleeve 18, water droplets, etc., are prevented from entering such a region, and thus an occurrence of corrosion can be suppressed. This extends the life-of the shock absorber 10. The same is true of the shock absorber 10A illustrated in FIG. 3.

Third, according to the shock absorber of the second example embodiment, O-rings are respectively applied as the respective-end-part sealing members 31 and 33. Application of the O-rings which are general products reduces the costs of the components, and thus the shock absorber 10 that accomplishes the cost reduction can be provided.

Fourth, the shock absorber 10 according to any one of the first to third example embodiments includes the displacement restricting component 11 which is provided at the first end of the sleeve 18, and which restricts the movement of the sleeve 18 in one direction, and the fastened member 27 which is provided on the outer circumferential surface of the sleeve 18, fastened between the displacement restricting component 11 and the second spring 22, and holds, together with the slider 23, the second spring 22 therebetween. The fastened member 27 includes the fastened-member protrusion 27c that protrudes in the radial direction. The sleeve 18 is pushed toward the displacement restricting component 11 by the pushing force of the second spring 22 through the fastened-member protrusion 27c.

By pushing the sleeve 18 by the second spring 22 toward the displacement restricting component 11, the shakiness of the sleeve 18 can be suppressed. Moreover, since it is unnecessary to hold the second-end side of the sleeve 18, the shock absorber 10 can be produced with a reduced number of components.

Fifth, the shock absorber 10 according to any one of the first to fourth example embodiment includes the abutting member 25 which is provided along the outer circumference of the cylinder 12, and which abuts the first end of the sleeve 18. The abutting member 25 includes the abutting-member main body 25a which is provided along the outer circumferential surface of the cylinder 12, and which abuts the first end of the sleeve 18, and the abutting-member extended portion 25b that extends from the abutting-member main body 25a along the outer circumferential surface of the sleeve 18. Provided in a space between the sleeve 18 and the abutting-member extended portion 25b is the abutting-member sealing member 32 that seals the space between the sleeve 18 and the abutting-member extended portion 25b.

Providing the abutting-member sealing member 32 at the abutting member 25 enables the abutting member 25 to also have a sealing function.

With reference to FIGS. 6A and 6B, sixth, according to the second shock absorber 10A of the second example embodiment, the respective-end-part sealing members 31A and 33A include the first side portions 31Aa and 33A, respectively, which extend along the outer circumferential surface of the cylinder 12, and the second side portions 31Ab and 33Ab, respectively, which are elongated outwardly in the radial direction from the respective first side portions 31Ab and 33Aa, and which abut the end portion of the sleeve 18.

The region between the cylinder 12 and the sleeve 18 can be sealed by the first side portions 31Aa and 33Aa, and the displacement of the sleeve 18 in the axial direction can be restricted by the second side portions 31Ab and 33Ab. The sleeve 18 can be fastened by the single component, which is preferable.

Seventh, according to the shock absorber 10A of the sixth example embodiment, the small-diameter portions 12Aa and 12Ab which have a smaller diameter than the diameter of the adjacent portion, and in which the respective first side portions 31Aa and 33Aa are fitted are formed in the outer circumferential surface of the cylinder 12. This facilitates the fastening of the respective-end-part sealing members 31A and 33A at the precise positions.

With reference to FIG. 6, eighth, according to the shock absorber 10B of the first example embodiment, the corrosion inhibitor 36B is the resin-made corrosion inhibiting resin component 36B in a cylindrical shape provided between the cylinder 12 and the sleeve 18. Since the corrosion inhibitor 36B is provided between the cylinder 12 and the sleeve 18, a contact of the cylinder 12 and the sleeve 18 through water droplets, etc., is suppressed, and thus corrosion can be suppressed.

Note that the shock absorber according to the present disclosure has been described regarding a side-by-side vehicle as an example, but the present disclosure is applicable to the front fork and the rear shock absorber of a saddle-riding type vehicle, vehicles other than the saddle-riding type vehicle and construction machineries, etc.

Moreover, the respective embodiments can be combined as appropriate. For example, the shock absorber 10 of the first embodiment and the shock absorber 10A of the second embodiment may be provided with the corrosion inhibiting resin component 36B that has been described in the third embodiment. Moreover, the upper-end-part sealing member may be a sealing member in a substantially L-shape in a cross-sectional view, the lower-end-part sealing member may be an O-ring, or vice versa.

Furthermore, some additional exemplary combinations of materials could include bronze and aluminum alloy, titanium and aluminum alloy, carbon and aluminum alloy, magnesium alloy and aluminum alloy, and as discussed above could also include non-metallic materials such as plastics, resins, carbon fiber etc.

As far as the actions and advantageous effects of the present disclosure can be accomplished, the present disclosure is not limited to the embodiments.

INDUSTRIAL APPLICABILITY

A shock absorber according to the present disclosure is suitable for a side-by-side vehicle.

What is claimed is:

1. A shock absorber comprising:
a cylinder which is formed in a substantially cylindrical shape, and which is formed of a metal;
a sleeve which is formed in a substantially cylindrical shape, provided so as to surround an outer circumferential surface of the cylinder, and is formed of a different metal from the metal of the cylinder;
first spring and second spring that are two springs provided along an outer circumferential surface of the sleeve; and
a slider which is provided between the first spring and the second spring, receives pushing forces from both the first spring and the second spring, and is capable of being displaced along the outer circumferential surface of the sleeve,
wherein the metal applied for the cylinder and the metal applied for the sleeve are a combination of metals that causes bimetalic corrosion due to a contact of either one of the cylinder or the sleeve with the other one of the sleeve or the cylinder, and
wherein a corrosion inhibitor is provided which suppresses an occurrence of the bimetalic corrosion on the cylinder or on the sleeve,
wherein:
respective-end-part sealing members which seal a region between the cylinder and the sleeve are provided at respective ends of a section where the cylinder and the sleeve overlap with each other; and
two corrosion inhibitors are formed by the respective-end-part sealing members, respectively.

2. The shock absorber according to claim 1, wherein O-rings are respectively applied as the respective-end-part sealing members.

3. The shock absorber according to claim 1, further comprising:
a displacement restricting component which is provided at a first end of the sleeve, and which restricts a movement of the sleeve in one direction; and
a fastened member which is provided on the outer circumferential surface of the sleeve, fastened between the displacement restricting component and the second spring, and holds, together with the slider, the second spring therebetween,
wherein the fastened member comprises a fastened-member protrusion that protrudes in the radial direction, and
wherein the sleeve is pushed toward the displacement restricting component by pushing force of the second spring through the fastened-member protrusion.

4. The shock absorber according to claim 1, further comprising an abutting member which is provided along the outer circumference of the cylinder, and which abuts a first end of the sleeve,
wherein the abutting member comprises: an abutting-member main body which is provided along the outer circumferential surface of the cylinder, and which abuts the first end of the sleeve; and an abutting-member extended portion that extends from the abutting-member main body along the outer circumferential surface of the sleeve, and
wherein, provided in a space between the sleeve and the abutting-member extended portion is an abutting-member sealing member that seals a space between the sleeve and the abutting-member extended portion.

5. The shock absorber according to claim 1, wherein:
each of the respective-end-part sealing members comprises: a first side portion which extends along the outer circumferential surface of the cylinder, and a second side portion which is elongated outwardly in a radial direction from the first side portion, and which abuts an end portion of the sleeve; and
respective ends of the sleeve abut the respective second side portions.

6. The shock absorber according to claim 5, wherein small-diameter portions which have a smaller diameter than a diameter of an adjacent portion, and in which the respective first side portions are fitted are formed in the outer circumferential surface of the cylinder.

7. A shock absorber comprising:
   a cylinder;
   a sleeve provided so as to surround an outer surface of the cylinder, the sleeve formed from a different material from a material of the cylinder, the combination of materials capable of causing corrosion due to a contact of either one of the cylinder and the sleeve with the other one of the sleeve and the cylinder;
   first and second springs provided along an outer surface of the sleeve;
   a slider provided between the first and second springs, receiving pushing forces from both the first and second springs, and capable of being displaced along an outer circumferential surface of the sleeve; and
   a corrosion inhibitor provided to suppress an occurrence of the corrosion on the cylinder or sleeve,
   wherein end-part sealing members are located at each of opposite ends of an overlapping section of the cylinder and the sleeve; and each of the end part sealing members forms a corrosion inhibitor.

8. The shock absorber according to claim 7, further comprising:
   a displacement restricting component provided at a first end of the sleeve, the displacement restricting component restricting movement of the sleeve in one direction; and
   a fastened member provided on the outer circumferential surface of the sleeve, the fastened member fastened between the displacement restricting component and the second spring to hold, together with the slider, the second spring therebetween,
   wherein the fastened member comprises a fastened-member protrusion protruding in a radial direction, and
   wherein the sleeve is pushed toward the displacement restricting component by a pushing force of the second spring through the fastened-member protrusion.

9. The shock absorber according to claim 2, further comprising an abutting member provided along the outer circumference of the cylinder, the abutting member abutting a first end of the sleeve,
   wherein the abutting member comprises: an abutting-member main body provided along the outer circumferential surface of the cylinder, the abutting member main body abutting the first end of the sleeve; and an abutting-member extended portion extending from the abutting-member main body along the outer circumferential surface of the sleeve, and
   wherein, an abutting member sealing member is provided in a space between the sleeve and the abutting-member extended portion to seal a space between the sleeve and the abutting-member extended portion.

10. The shock absorber according to claim 7, wherein:
    each of the end-part sealing members comprises: a first side portion extending along the outer circumferential surface of the cylinder, and a second side portion elongated outwardly in a radial direction from the first side portion, the second side portion abutting an end portion of the sleeve; and
    opposite ends of the sleeve abut the second side portions of the end part sealing members.

11. The shock absorber according to claim 10, wherein the outer surface of the cylinder includes small-diameter portions having a smaller diameter than a diameter of an adjacent portion of the cylinder, and in which the first side portions of the end part sealing members are fitted.

* * * * *